United States Patent [19]

White

[11] Patent Number: 4,469,598
[45] Date of Patent: Sep. 4, 1984

[54] FILTER DEVICE

[75] Inventor: Leslie R. White, Horseheads, N.Y.

[73] Assignee: The Hilliard Corporation, Elmira, N.Y.

[21] Appl. No.: 448,145

[22] Filed: Dec. 9, 1982

[51] Int. Cl.³ ............................................. B01D 25/04
[52] U.S. Cl. .................................... 210/489; 210/491; 210/492; 210/DIG. 10; 55/486
[58] Field of Search ................................... 55/486–489, 55/498, 524, 528; 210/489–492, 493.2, 493.5, 100, DIG. 10, DIG. 11

[56] References Cited

U.S. PATENT DOCUMENTS

| | | | |
|---|---|---|---|
| 2,341,414 | 2/1944 | Polivka | 210/491 |
| 2,554,814 | 5/1951 | Catlin et al. | 210/491 |
| 4,117,184 | 9/1978 | Erickson | 428/304.4 |
| 4,145,285 | 3/1979 | Martin et al. | 210/100 |
| 4,242,206 | 12/1980 | Estabrooke | 210/489 |
| 4,286,977 | 9/1981 | Klein | 55/528 |
| 4,324,574 | 4/1982 | Fagan | 55/487 |

Primary Examiner—David Lacey
Attorney, Agent, or Firm—Seidel, Gonda & Goldhammer

[57] ABSTRACT

A filter device is provided with a multi-layer filter which includes a central highly absorbent layer which expands in the presence of moisture and positioned between an outer layer of absorbent paper and an inner layer of fiber glass adjacent to an inner ply. The filter is longitudinally pleated.

12 Claims, 4 Drawing Figures

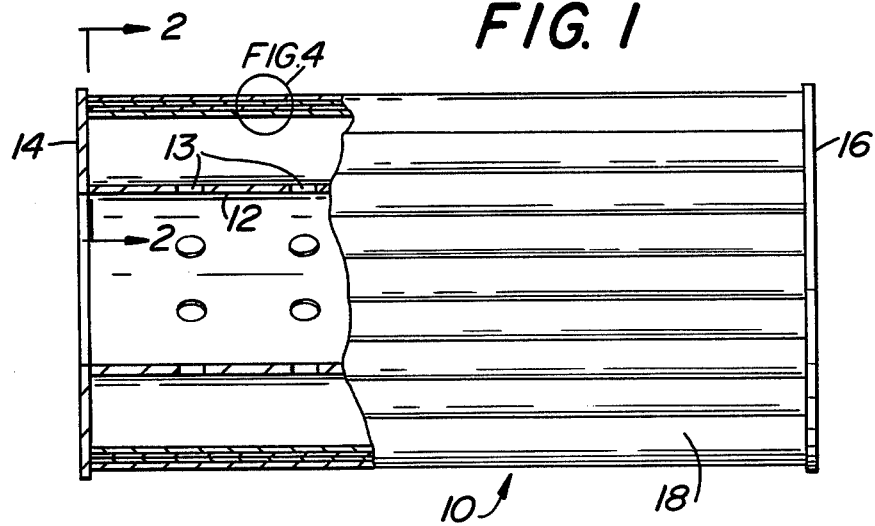
FIG. 1
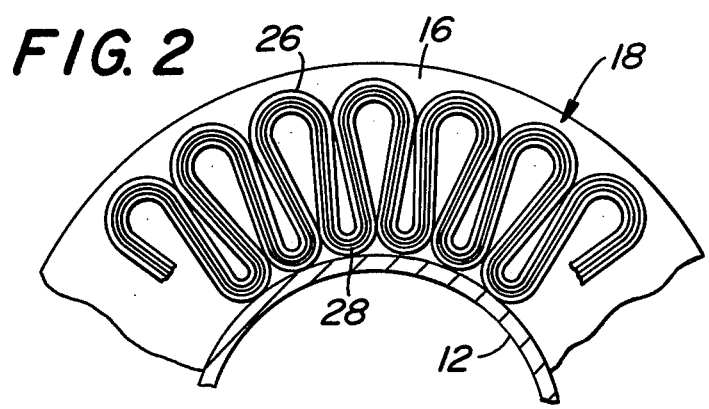
FIG. 2
FIG. 3
FIG. 4

FILTER DEVICE

BACKGROUND

There is a need for a filter device having the following characteristics:
a. increased particulate holding capacity,
b. lower initial clean pressure drop,
c. large pressure drop increase to indicate that the filter device is saturated with water, and
d. minimize the cost of contaminant removal. The present invention is directed to a solution of that problem.

SUMMARY OF THE INVENTION

The present invention is directed to a filter device for fluids such as insulating oil, hydraulic oil and lube oil, for example, wherein a multi-layer filter is mounted on a support. The filter has a central highly abosrbent layer which expands in the presence of moisture and positioned between inner and outer layers. The outer layer is a layer of absorbent paper. The inner layer includes a layer of microglass adjacent to an inner ply. The outer layer is the thickest layer and is at least several times as thick as the central layer.

Various objects and advantages of the present invention are set forth hereinafter.

For the purpose of illustrating the invention, there is shown in the drawings a form which is presently preferred; it being understood, however, that this invention is not limited to the precise arrangements and instrumentalities shown.

FIG. 1 is an elevation view of a filter device in accordance with the present invention and partly in section.

FIG. 2 is a sectional view taken along the line 2—2 of FIG. 1.

FIG. 3 is a sectional view showing the joint between the ends of the filter.

FIG. 4 is a sectional view taken on an enlarged scale and indicated by the circle in FIG. 1.

DETAILED DESCRIPTION

Referring to the drawing in detail, wherein like numerals indicate like elements, there is shown in FIG. 1 a filter device in accordance with the present invention designated generally as 10. The device 10 includes a support 12 which is preferably in the form of a hollow tube having radially outwardly extending end caps 14 and 16 between which is provided the filter 18. The end caps 14 and 16 prevent the fluid from by-passing the filter 18. The filter 18 is pleated from a sheet with the end portions 20 and 22 bonded together by a bonding agent 24 as shown clearly in FIG. 3. The longitudinal pleats in the filter 18 provide outer pleats 26 which are of larger transverse dimensions than the inner pleats 28. Support 12 has holes 13 adjacent the inner pleats 28.

The filter 18 is a laminate of a plurality of layers juxtaposed to one another but not bonded to each other. The arrangement of the various layers of the filter 18 is more important than the pleating which constitutes the preferred embodiment because of the increased surface area. Flow of fluids to be filtered is in a direction from the outermost layer toward the innermost layer and then through perforation holes 13 in the support 12.

The outermost layer is the thickest layer of the filter 18 and is designated 30. Layer 30 is preferably a layer of absorbent filter paper having high permeability which in combination with other layers will result in graduated density through the filter. Graduated density provides greater depth filtration and increases particulate capacity. Particulates encountered are often extremely fine, such as less than three microns, whereby depth filtration will provide for a high contaminant capacity.

The central layer 32 is preferably a polymer film which expands on contact with moisture and has a capacity (gram/gram) of 35 to 48 times its own weight. The preferred material for layer 32 is a crosslinked acrylic polymer film as disclosed in U.S. Pat. No. 4,117,184. The layer 32 is preferably sandwiched between layers 34 and 36 of lightweight absorbent cellulosic tissue. The tissue layers 34, 36 protect the layer 32 during handling, add absorbency, and provides faster liquid distribution for absorption.

The inner layer 40 is a microglass filter element supported by a resin-saturated filter paper ply 38 which provides final filtration. Microglass is a fine filtration grade of fiberglass. The layer 38 acts as a support layer for the microglass layer 40. The layers 38, 40 provide for fine filtration and by being the inner plies, they are protected from damage during handling and shipping. As a result, packaging for shipping need only amount to sealing the device 10 in a plastic bag.

Cost effectiveness is further achieved by using layer 32 in conjunction with less expensive absorbent paper layer 30. Layer 30 absorbs most of the moisture. Layer 32 provides for a large pressure drop increase when saturated. With the various layers in the sequence disclosed herein, the goals set forth above are achieved. The filter device 10 is capable of both water absorption and fine particulate filtration. When the layer 32 expands, it causes the device 10 to blind off thereby providing a pressure increase which is a water indicator. Layer 30 has sufficient wet strength to resist bursting when layer 32 is saturated.

For purposes of illustration, and not for purposes of limitation, the chart below sets forth the preferred parameters for the various layers of the filter 18.

| Property | Layer 38 | Layer 40 | Layer 32 | Layer 30 |
| --- | --- | --- | --- | --- |
| Basis Wt. (lbs/ream) | 115–145 |  | 50 | 180–200 |
| Frazier (CFM) | 35–55 | 3–10 | 20 | 20–24 |
| Thickness (in.) | .024–.040 | .012 | .008 | .040–.045 |
| Mullen (PSI) |  |  |  |  |
| Dry | 25–35 |  |  | 35 |
| Wet | 30–40 |  |  | 10–15 |
| Tensile (lbs/in) Dry-MD | 30–40 |  |  | 25 |
| Tensile Dry-AM | 15–20 |  |  | 15 |
| Tensile Wet-MD | 15–20 |  |  | 5 |
| Tensile Wet-AM | 7–10 |  |  | 4 |
| Stiffness (mg) |  |  |  |  |
| Dry-MD | 5,000 |  |  | 7,000 |
| -AM | 2,000 |  |  | 4,000 |
| Wet-MD | 2,000 |  |  | 2,000 |
| -AM | 1,000 |  |  | 1,000 |

It is an advantage of the present invention that each of the layers is separately commercially available.

The present invention may be embodied in other specific forms without departing from the spirit or essential attributes thereof and, accordingly, reference should be made to the appended claims, rather than to the foregoing specification, as indicating the scope of the invention.

I claim:

1. A filter device comprising a support on which is mounted a multilayer filter, said support constructed so as to allow fluid to flow therethrough and having means to prevent bypassing of fluid being filtered, said filter having a central highly absorbent layer which expands in the presence of moisture and positioned between an outer layer and an inner layer, the outer layer being absorbent paper layer, the inner layer being a layer of microglass mounted on an inner ply, the outer layer being the thickest layer and being at least several times as thick as the central layer, the layers providing for graduated density in the direction of flow from the outer layer to the inner ply.

2. A device in accordance with claim 1 wherein said outer layer is absorbent paper having high permeability, said central layer being a polymeric film, and said inner ply being a resin impregnated paper.

3. A filter device in accordance with claim 1 wherein said filter has longitudinally extending inner and outer pleats surrounding said support.

4. A device in accordance with claim 1 wherein said central layer is a cross-linked acrylic polymer film.

5. A device in accordance with claim 4 including a layer of lightweight abosrbent cellulosic tissue on opposite faces of said film.

6. A filter device comprising a support on which is mounted a multilayer filter, said support constructed so as to allow fluid to flow therethrough, said filter having graduated density and progressive fine particulate filtration in a direction of fluid flow through the filter, said filter having a central highly absorbent layer which expands in the presence of moisture and positioned between an outer layer and an inner layer, the outer layer being an absorbent highly permeable vapor layer, the inner layer being a layer of microglass, the inner layer being supported by an inner ply of resin impregnated paper.

7. A filter device in accordance with claim 6 wherein said filter is cylindrical and has longitudinally extending inner and outer pleats surrounding said support which has holes therethrough.

8. A device in accordance with claim 6 wherein said central layer is a cross-linked acrylic polymer film and said central layer is sandwiched between paper tissues.

9. A device in accordance with claim 6 wherein the outer layer is the thickest layer and the central layer being the thinnest layer.

10. A filter device comprising a support on which is mounted a multilayer filter, said support having discharge openings through which fluid being filtered flows, said support having means to prevent bypassing of fluid being filtered, said filter having a central highly absorbent layer which expands in the presence of moisture and positioned between an outer layer and an inner layer, the outer layer being an absorbent paper layer, the inner layer being a layer of microglass mounted on an inner ply, the outer layer being the thickest layer and being at least several times as thick as the central layer, the layers providing for graduated density in the direction of flow from the outer layer to the inner ply.

11. A filter device in accordance with claim 10 wherein the means to prevent bypassing of fluid comprises spaced end caps mounted on the support between which the fluid being filtered flows.

12. A filter device comprising a support on which is mounted a multilayer filter having graduated density and progressive fine particulate filtration in a direction of fluid flow through the filter, said support having openings through which fluid being filtered flows and means to prevent bypassing of fluid being filtered, said filter having a central highly absorbent layer which expands in the presence of moisture and positioned between an outer layer and an inner layer, the outer layer being an absorbent highly permeable paper layer, the inner layer being a layer of microglass, the inner layer being supported by an inner ply of resin impregnated paper.

* * * * *